(No Model.)

J. BÜHRER.
ROOT FERTILIZER.

No. 349,874. Patented Sept. 28, 1886.

WITNESSES:
Chas. Nicols
C. Sedgwick

INVENTOR:
J. Bührer
BY Munn & Co
ATTORNEYS.

UNITED STATES PATENT OFFICE.

JACOB BÜHRER, OF KONSTANZ, BADEN, GERMANY, ASSIGNOR OF ONE-HALF TO FRANK B. VAN DE VELDE, HENRY T. VAN DE VELDE, AND BERNARD F. VAN DE VELDE, ALL OF CLEVELAND, OHIO.

ROOT-FERTILIZER.

SPECIFICATION forming part of Letters Patent No. 349,874, dated September 28, 1886.

Application filed April 8, 1886. Serial No. 198,291. (No model.) Patented in Germany August 4, 1884, No. 27,756, and in Austria-Hungary August 5, 1884, No. 1,354 and No. 34.

*To all whom it may concern:*

Be it known that I, JACOB BÜHRER, of Konstanz, Grand Duchy of Baden, Germany, have invented a new and useful Improvement in Root-Fertilizers, (for which I have obtained Letters Patent from Germany, No. 27,756, August 4, 1884, and Austria-Hungary, No. 1,354 and No. 34, August 5, 1884,) of which the following is a specification, reference being had to the annexed drawings, forming a part thereof, in which—

Figure 1:
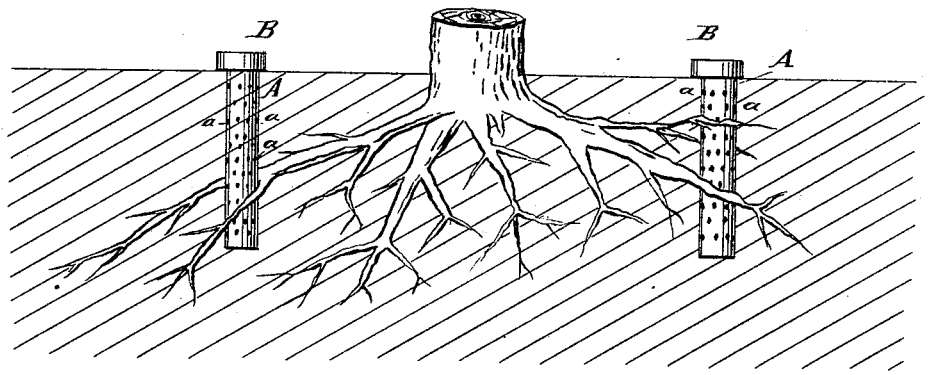
Figures 2, 4:
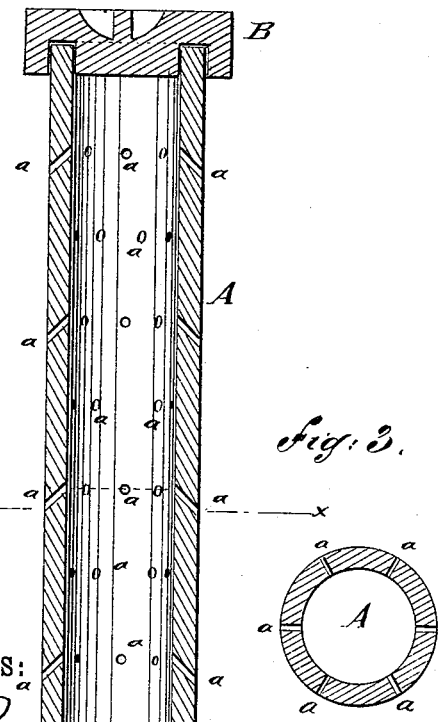
Figure 3:
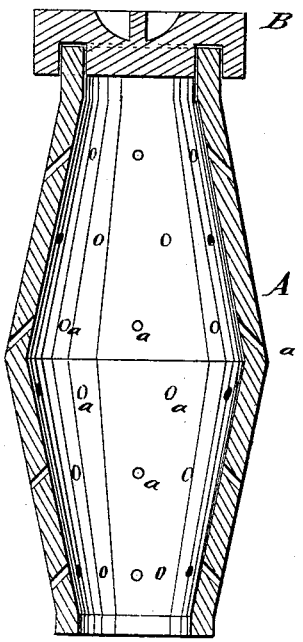

Figure 1 is a side elevation showing the application of my improvement. Fig. 2 is a vertical transverse section. Fig. 3 is a horizontal section taken on line $x\ x$ in Fig. 2. Fig. 4 is a vertical transverse section of a modified form of the device.

Similar letters of reference indicate corresponding parts in the different figures of the drawings.

The object of my invention is to provide simple and efficient means for carrying liquid or semi-liquid fertilizers to the roots of trees and to the lower strata of soil.

My invention consists in a pipe open at both ends and having perforated sides, and a cover for closing the upper end, the pipes being set in the ground with their upper ends about even with the surface of the ground. The pipes A may be cylindrical in form, as shown in Figs. 1 and 2, with a uniform diameter and thickness throughout their entire length, or they may be enlarged in the middle or formed in the shape of a jar, as shown in Fig. 4. The sides of the pipes A are perforated with series of holes $a$, which are preferably inclined from the inner side of the pipe or jar downward, to facilitate the cleaning of the holes when they become stopped with roots or earth or the fertilizer introduced into the pipe. The pipes A are set in the earth around the roots of a tree, with their upper ends about even with the level of the ground. The pipes will be set in the same manner when it is desired to enrich the soil of the garden or field.

The fertilizer employed in connection with my improved device may consist of muck-water alone or guano dissolved in ordinary water or in the muck-water, or with any other suitable fertilizer. As some of the fertilizers which are used in connection with the distributing-pipe A have an offensive odor, I have provided a cover or cap, B, for the pipe, which shuts down over the upper end of the pipe and prevents the escape of the offensive odors, at the same time excluding dust, leaves, and other matters that might otherwise be blown into the mouth of the pipe and destroy its efficiency by stopping the small apertures $a$. The fertilizer contained by the pipe will slowly ooze through the apertures $a$ in the sides of the pipe, and should it be desired to still further diffuse the fertilizer the pipe may be filled with water, which will dilute the fertilizer and carry it farther away from the distributing-pipe A. Should the open lower end of the pipe A permit the fertilizer to escape too freely at that point, it may be stopped by means of a stratum of clay or other suitable material. Should the holes $a$ become stopped by the fertilizer or by the roots of plants or trees growing in the vicinity of the pipes A, the holes $a$ may be cleared out by means of a pointed wire. The subsoil of land may be enriched in the manner already described, so that when the subsoil is plowed or dug up it will be in good condition for the reception and nurture of crops. The pipe is made of clay, artificial stone, wood, or other material suitable for the purpose, and it may be made in cylindrical or jar form, as shown, or in any other convenient or desirable shape.

Having thus described my invention, what I claim as new, and desire to secure by Letters Patent, is—

1. A distributer for fertilizers, formed of a pipe open at the ends and having perforated sides, substantially as herein shown and described.

2. A pipe for distributing fertilizers, open at the ends and having inclined apertures in the sides thereof, substantially as herein shown and described.

3. The combination, with the fertilizer-distributing pipe A, provided with the inclined holes in the walls thereof, of a cover, B, fitted to the end of the pipe, substantially as herein shown and described.

In testimony whereof I affix my signature in presence of two witnesses.

JACOB BÜHRER.

Witnesses:
 EMIL BLUM,
 ROBERT OSTERMAYER.